J. HENRY.
Churn.
No. 58,415. Patented Oct. 2, 1866.
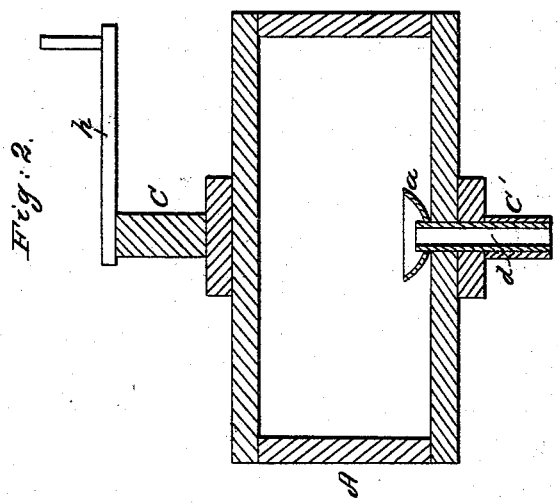
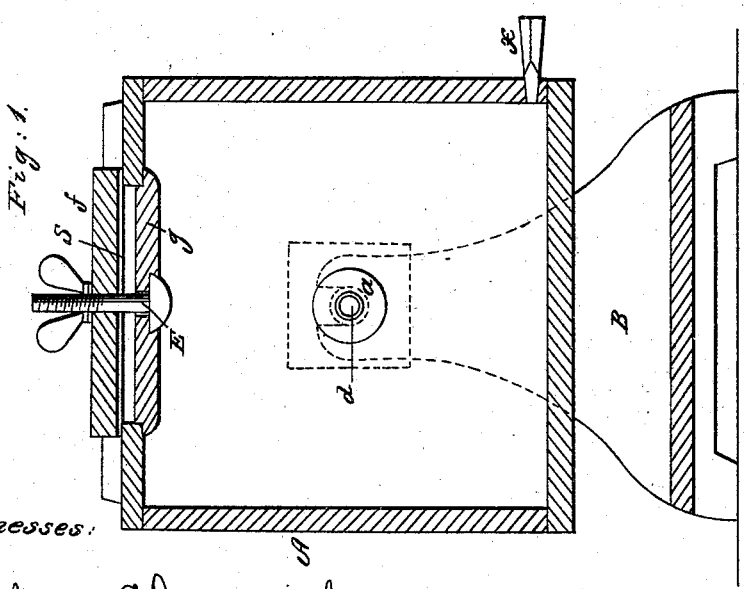
Witnesses:
C. M. Alexander
J. M. Mason
Inventor:
Joshua Henry

UNITED STATES PATENT OFFICE.

JOSHUA HENRY, OF STEUBENVILLE, OHIO.

IMPROVEMENT IN CHURNS.

Specification forming part of Letters Patent No. 58,415, dated October 2, 1866.

*To all whom it may concern:*

Be it known that I, JOSHUA HENRY, of Steubenville, in the county of Jefferson and State of Ohio, have invented certain new and useful Improvements in Churns, and do hereby declare that the following is a full, clear, and exact description of the same, reference being had to the accompanying drawings and the letters of reference marked thereon, making a part of this specification.

In the annexed drawings, A represents the churn-box, which may be made of wood or other suitable material. This box is made in a quadrilateral form; but it may be made of any suitable form wherein square surfaces are formed on the inner side.

My invention consists in a revolving churn, and is supported upon suitable bearings B by means of the journals C and C', which are attached to the sides of box A. The journal C' is open through its center, wherein there is inserted a metal tube, $d$, which tube passes through an opening in the churn-box for the purpose of admitting air into the cream during the operation of churning.

$a$ represents a funnel-shaped piece of metal, which incloses the end of the tube $d$ and sits directly against the side of the churn-box. The objects of this tube and funnel are to prevent the egress of the cream from the box during the revolutions of the box A, and keep a constant and regular current of air diffused in the cream. By experience I have found that the connecting of the funnel alone to the box will allow the cream and milk to ooze out through the opening in its center, while by the insertion of the tube $d$ and passing into the funnel the cream will strike against the inside of the funnel, and is prevented from passing out by the end of the tube.

It will be understood that this churn-box will not be filled quite half-full of cream, as the opening through the tube $d$ will allow it to pass out.

At the top of the box is a hole cut to admit the cream or collect the butter. This opening is covered and made completely air and milk tight by means of the upper lid, $f$, and the lower lid, $g$, which have a piece of india-rubber, $s$, placed between them. Passing through the center of the lids $f$ and $g$ and the rubber $s$ is a screw, E, which regulates the distance between the two lids and causes the compression of the rubber, so that the ingress of air is impossible.

The churn-box may be taken from its bearings at any time for the purpose of washing.

$x$ represents a plug which closes a small opening in the bottom of box A. This opening is intended to empty the cream from the box after churning, or the water after the butter has been washed.

By the use of this invention the difficulty of collecting the small fragments of butter is completely obviated, as the butter collects itself by falling on the squre surfaces of the box and forms into a lump. Then, after the milk is drawn off, the butter remaining in the churn, water is placed in the box in lieu of the cream and again revolved, and thoroughly washes the butter free of milk.

Having thus fully described my invention, what I claim as new, and desire to secure by Letters Patent, is—

The arrangement of the metal tube $d$, passing through the journal C' and into and beyond the bottom of the funnel $a$, when used in combination with the revolving churn-box A, substantially as and for the purposes specified.

As evidence that I claim the foregoing I have hereunto set my hand in the presence of two witnesses.

JOSHUA HENRY.

Witnesses:
C. M. ALEXANDER,
J. M. MASON.